Feb. 16, 1954 J. W. GOFF 2,669,220
GUARD FOR POULTRY DRINKING FOUNTAIN BOWLS
Filed Nov. 20, 1950
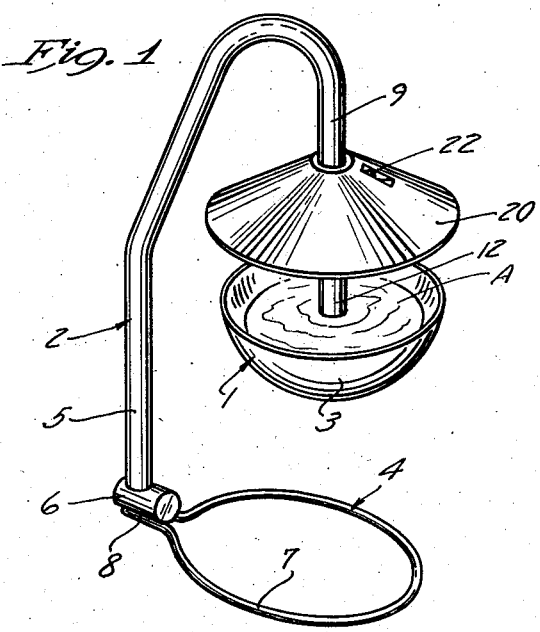
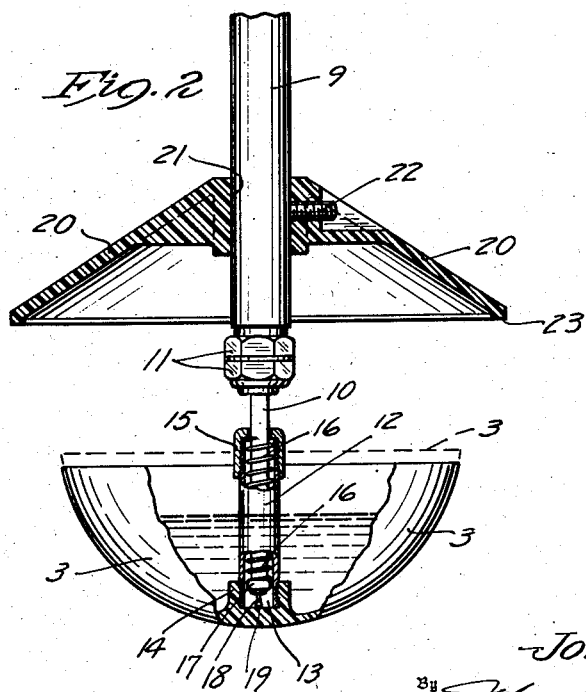
Inventor
John W. Goff
By
Attorneys Patented Feb. 16, 1954

2,669,220

UNITED STATES PATENT OFFICE 2,669,220

GUARD FOR POULTRY DRINKING FOUNTAIN BOWLS

John W. Goff, St. Paul, Minn., assignor to Miller Manufacturing Company, Incorporated, St. Paul, Minn., a corporation of Minnesota Application November 20, 1950, Serial No. 196,549

1 Claim. (Cl. 119—81)

My invention relates to improvements in drinking founts for poultry and the like and more specifically is in the nature of an improvement on the United States Patent No. 2,501,727.

I have found in founts of the type exemplified in the prior patent above-identified, that fowls as well as other birds such as pigeons and the like are wont to perch on the rim of the drinking bowl, thus adding sufficient weight thereto to prevent the water from being replenished when necessary. The primary object of my invention is, therefore, the provision of means for preventing birds from perching on the rim of the drinking bowl but permitting free access thereto for drinking purposes.

Another object of my invention is the provision of a canopy-like guard element for founts of the type described which will overlie the drinking bowl in spaced relation thereto and means for adjusting the space between the guard element and the top of the drinking bowl.

Another object of my invention is the provision of a guard element as set forth which is simple and inexpensive to manufacture, which may be easily installed on a drinking fount, and which is rugged in construction and durable in use.

Other highly important objects and advantages of my invention will become apparent from the following detailed specification, appended claim, and attached drawings.

Referring to the drawings which illustrate the invention and in which like characters indicate like parts throughout the several views:

Fig. 1 is a view in perspective of a fount for poultry and the like incorporating my invention; and Fig. 2 is an enlarged fragmentary view in side elevation of a drinking bowl and supply conduit therefor, some parts being broken away, and showing my novel guard element in axial section.

Referring with greater detail to the drawings, numeral 1 indicates in its entirety, a drinking fount for chickens or like fowl, and comprises a supporting element in the nature of a rigid water supply conduit 2 of inverted generally U-shape, an open-topped drinking bowl or receptacle 3 and a base 4. One depending leg 5 of the conduit 2 terminates in a coupling 6 which is adapted to receive a hose or other conduit means, not shown, and which may be assumed to deliver drinking water to the fount from a source of supply, not shown. The base 4 may be of any suitable type but preferably and as shown comprises a circular member 7 which underlies the drinking bowl 3 and is welded or otherwise secured to the coupling 6 as indicated at 8.

The opposite end portion 9 of the supply conduit 2 extends downwardly and is provided with a downwardly projecting extension 10, the upper end of which is connected thereto by a conventional nut-equipped coupling 11. The coupling 11 also functions as a stop means, referred to hereinafter. The extension 10 projects loosely through a tubular element or sleeve 12, the lower end of which is screw-threaded and receivable in an upwardly opening recess 13 defined by a central internally threaded boss 14 integrally formed with the bowl 3. A cap 15 is screw-threaded on the upper end of the sleeve 12 and provides an abutment for one end of a coil compression spring 16 loosely encompassing the extension 10 and having its lower end engaging a head portion 17 on the lower end of the extension 10. A valve of the type commonly used in pneumatic tires is indicated at 18 and is mounted in the lower end of the extension 10, the valve stem 19 thereof abutting the bottom wall of the recess 13. The drinking bowl 3 and connections therebetween and the end portion 9 of the supply conduit 2 are fully disclosed in the prior patent above-identified. The operation thereof being fully set forth in said patent, it is not deemed necessary to repeat the same herein. It should suffice to state that the combined weight of the drinking bowl and a predetermined quantity of water therein will move the bowl 3 and sleeve 12 downwardly against bias of the spring 16 to permit the valve 18 to close thereby shutting off the supply of water to the bowl 3. In the drawings, the water in the bowl is indicated by A. As the water A is consumed, the diminished weight thereof permits the spring 16 to raise the bowl 3 to approximately the position indicated by dotted lines in Fig. 2, whereupon the valve 18 will open to admit water to the interior of the bowl from the supply conduit.

As above indicated, chickens, pigeons, and other birds sometimes perch or roost on the rim of the drinking bowl 3 for extended periods of time. The combined weight of a bird and the bowl 3 are often sufficient to prevent the spring 16 from raising the bowl to cause the valve 18 to open. Furthermore, the water in the bowl often becomes fouled by the droppings from the birds perched on the rim of the bowl. For preventing birds from perching on the rim of the bowl 3, I provide a canopy-like imperforate guard element 20 which is preferably conical in shape and which is provided with a central aperture 21. The guard element 20 is adapted to be mounted in overlying spaced relationship to the drinking bowl 3, the end portion 9 of the supply conduit 2 projecting downwardly through the aperture 21. A set screw or the like 22 is screw-threaded through a portion of the guard element 20 and thrusts against the conduit end portion 9 to lock the guard element at a desired height above the drinking bowl. The guard element 20 is preferably of greater diameter than that of the drinking bowl 3 whereby to extend over the area defined by the drinking bowl, and when the guard element 20 rests on the coupling or stop means 11 the space between the lower peripheral edge 23 of the guard element and the rim or edge of the drinking bowl 3 is sufficient to permit a chicken or other fowl to gain easy access therebetween to the water A in the bowl, but not sufficient to permit the chicken to perch on the rim of the bowl. The guard element 20 is preferably made from plastics or other material which will present a smooth outer surface whereby to prevent birds from gaining a foothold thereon.

My invention has been thoroughly tested and found to be completely satisfactory for the accomplishment of the objectives set forth; and, while I have shown and described a commercial embodiment of my novel device, it will be understood that the same is capable of modification without departure from the spirit and scope of the invention as defined in the claim.

What I claim is:

A fount for poultry including a depending supporting conduit adapted to be connected to a source of water under pressure, valve means in said conduit, an open top receptacle, means mounting said receptacle to the lower discharge end of the conduit in spaced relation to the ground for upward and downward movements with respect to said conduit, means on said valve means operatively associated with said receptacle for causing the valve to open responsive to predetermined upward movements of said receptacle and permitting the valve to close responsive to predetermined downward movement of said receptacle, yielding means biasing said receptacle in an upward valve-opening direction, the combined weight of the receptacle and a predetermined quantity of water contained therein overcoming the bias of said yielding means to close said valve, a substantially imperforate conical guard element disposed in overlying relation to the receptacle and having a central aperture through which said conduit extends, said guard element extending over the area defined by said receptacle, said guard element being vertically adjustably movable on said conduit toward and away from the receptacle, said conduit providing stop means positively limiting downward movement of the guard element, and means connected to the guard element for locking the guard element against movement relative to said conduit, the normal spacing between the guard element and the receptacle permitting free access to the interior of the receptacle of the head and neck of a fowl, but preventing the fowl from perching on the rim of the receptacle, the lower edge of said guard element at the lowermost position thereof against said stop means and the upper edge of said receptacle in its upper valve open position defining a space sufficient to receive the neck of a fowl drinking from said receptacle.

JOHN W. GOFF.

References Cited in the file of this patent

UNITED STATES PATENTS

| Number | Name | Date |
|---|---|---|
| 1,210,601 | Clark | Jan. 2, 1917 |
| 1,666,322 | West | Apr. 17, 1928 |
| 1,699,501 | McCartney | Jan. 15, 1929 |
| 1,815,679 | Ruth | July 21, 1931 |
| 2,107,573 | Langdon et al. | Feb. 8, 1938 |
| 2,233,832 | Byrd | Mar. 4, 1941 |
| 2,267,883 | Wood | Dec. 30, 1941 |